Dec. 11, 1945.   P. K. FELLNER   2,390,700
FLEXIBLE BAND KNIFE
Filed Oct. 23, 1944
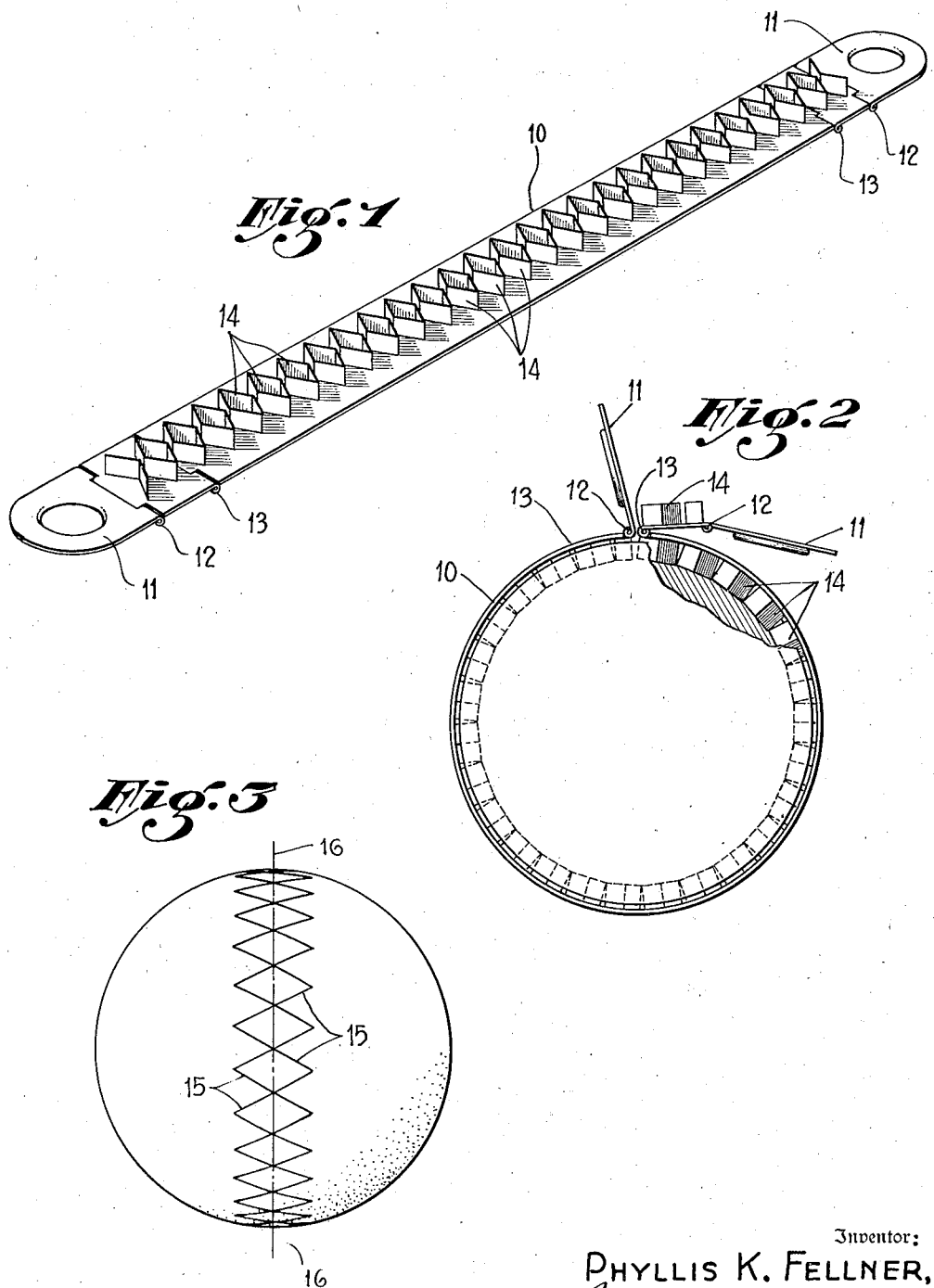
Inventor:
PHYLLIS K. FELLNER,
By Robert M. McManigal
Attorney.

Patented Dec. 11, 1945

2,390,700

UNITED STATES PATENT OFFICE 2,390,700

FLEXIBLE BAND KNIFE

Phyllis K. Fellner, Los Angeles, Calif.

Application October 23, 1944, Serial No. 559,961

3 Claims. (Cl. 30—304)

This invention relates to knives, and, in particular, to knives which are used for cutting fruit in such a manner as to present a pleasing and ornamental appearance.

A object of my invention is to provide a knife of this character which is economical to construct and which is simple and easy to operate.

Another object of my invention is to provide a knife of this character which comprises a flexible band having blades projecting from the band.

Another object of my invention is to provide a knife of this character which is adapted to be used on fruits of various sizes.

My invention has other objects, advantages, and features, some of which, with the foregoing, will be set forth at length in the following description where I shall outline one form of my invention, which I have selected for illustration in the drawing accompanying and forming a part of the present specification.

In the drawing:

Figure 1 is a perspective view of the flexible band knife of my invention.

Figure 2 is an elevational view showing the knife of my invention encircling an orange, with the blades cutting the peel of the orange.

Figure 3 is an elevational view of an orange as the orange appears after the cutting operation shown in Figure 2.

In the drawing, the numeral 10 indicates a flexible band, having hinged handles 11. In order to be operated on fruits of different sizes, parts of the band may be, but are not necessarily hinged together as at 12 and 13.

Projecting from the flexible band 10 are cutting blades 14, which blades are positioned and so shaped in order to cut portions of the peel or skin of the fruit, in accordance with the desired result.

In operation, the flexible band 10 is placed around the center of a spherical fruit such as an orange or grapefruit, and the portion of the band in contact with the fruit is drawn tight. Then a slight pressure around the band forces the blades into the peel or skin of the fruit, as shown in Figure 2, after which the knife is removed. The peel or skin of the fruit between the diamond-shaped edges 15 is removed, leaving the remainder of the peel or skin evenly serrated. The fruit may then be cut in half along the line 16.

In the form of my invention shown in the drawing, the blades are diamond-shaped in order to produce the result shown in Figure 3. However, the blades may be curved to form a scalloped or other curved design or placed in any other desired configuration depending upon the ornamental results desired. The knife may be used on oranges, grapefruit, cantaloupes or any other spherical fruit or vegetable.

From the foregoing description taken in connection with the accompanying drawing the uses, advantages, and operation of the flexible band knife of my invention will be readily understood by those skilled in the art to which the invention appertains. While I have described the principle of operation, together with the form of my invention which I now consider to be the best embodiment thereof, I desire to have it understood that the form shown is merely illustrative and that the invention is not to be limited to the details disclosed herein, but is to be accorded the full scope of the appended claims.

I claim as my invention:

1. A knife comprising a flexible band for encircling the fruit and diamond-shaped blades projecting inwardly from said flexible band in operative position.

2. A knife comprising a flexible band, portions of said band being hinged together, handles hinged to said band, and blades projecting from said flexible band.

3. A knife comprising a flexible band, portions of said band being hinged together, and blades projecting from said flexible band.

PHYLLIS K. FELLNER.